(12) United States Patent
Prieditis

(10) Patent No.: US 12,155,735 B2
(45) Date of Patent: *Nov. 26, 2024

(54) METHOD AND SYSTEM FOR PREDICTING A GEOGRAPHIC LOCATION OF A NETWORK ENTITY

(71) Applicant: Neustar, Inc., Reston, VA (US)

(72) Inventor: Armand Prieditis, Arcata, CA (US)

(73) Assignee: NEUSTAR, INC., Reston, VA (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/092,704

(22) Filed: Jan. 3, 2023

(65) Prior Publication Data
US 2023/0231926 A1    Jul. 20, 2023

Related U.S. Application Data

(63) Continuation of application No. 16/155,115, filed on Oct. 9, 2018, now Pat. No. 11,546,439, which is a continuation of application No. 14/535,109, filed on Nov. 6, 2014, now Pat. No. 10,097,647.

(51) Int. Cl.
*H04L 67/52* (2022.01)
*H04L 43/00* (2022.01)

(52) U.S. Cl.
CPC ............. *H04L 67/52* (2022.05); *H04L 43/00* (2013.01)

(58) Field of Classification Search
CPC ......... H04L 43/00; H04L 47/14; H04L 47/18; H04L 47/283; H04L 61/2007; H04L 61/609; H04L 67/609; H04W 64/00; G06N 5/04; G06N 99/005
See application file for complete search history.

(56) References Cited

U.S. PATENT DOCUMENTS

| 6,526,371 | B1 | 2/2003 | Klein et al. |
| 9,014,029 | B1 | 4/2015 | Dawson et al. |
| 9,166,884 | B2 | 10/2015 | Suizo |
| 10,097,647 | B2 | 10/2018 | Prieditis |
| 11,546,439 | B2 | 1/2023 | Prieditis |
| 2002/0128925 | A1 | 9/2002 | Angeles |

(Continued)

OTHER PUBLICATIONS

Scellato et al. "NextPlace: A Spatio-temporal Prediction Framework for Pervasive Systems", in Lyons et al. (Eds): Pervasive, 2011, pp. m152-169.*

(Continued)

*Primary Examiner* — Li Wu Chang
(74) *Attorney, Agent, or Firm* — Sterne, Kessler, Goldstein & Fox P.L.L.C.

(57) ABSTRACT

A method and system for predicting the geographic location of a network entity are described. Examples include predicting the geographic location of a network entity by directing the network entity to transmit one or more data packets to a number of predetermined network identifiers, such as IP addresses, where data corresponding to each of the network identifiers is part of a geographic location prediction model. In examples, a dataset that represents transit times for the data packets transmitted from the network entity to the hosts identified by the IP addresses is determined, and a geographic location for the network entity is predicted by applying the geographic location prediction model to the dataset.

20 Claims, 6 Drawing Sheets

(56) References Cited

U.S. PATENT DOCUMENTS

| | | |
|---|---|---|
| 2007/0058555 A1 | 3/2007 | Blair et al. |
| 2009/0281886 A1 | 11/2009 | Castelli et al. |
| 2011/0282988 A1 | 11/2011 | Wang et al. |
| 2013/0031033 A1 | 1/2013 | Prieditis |
| 2015/0057846 A1 | 2/2015 | Fanara et al. |
| 2015/0245402 A1 | 8/2015 | Mochizuki |
| 2016/0132774 A1 | 5/2016 | Prieditis |
| 2019/0260839 A1 | 8/2019 | Prieditis |

OTHER PUBLICATIONS

Williams et al. "A Preliminary Performance Comparison of Five Machine Learning Algorithms for Practical IP Traffic Flow Classification", ACM CC Review, 2006, pp. 7-15.*

* cited by examiner

METHOD AND SYSTEM FOR PREDICTING A GEOGRAPHIC LOCATION OF A NETWORK ENTITY

RELATED APPLICATIONS

This application is a Continuation of U.S. patent application Ser. No. 16/155,115, filed Oct. 9, 2018, which is a Continuation of U.S. patent application Ser. No. 14/535,109, filed Nov. 6, 2014, now U.S. Pat. No. 10,097,647, each of which is hereby incorporated by reference in its entirety for all purposes.

TECHNICAL FIELD

Examples described herein relate to a method and system for predicting a geographic location of a network entity.

BACKGROUND

Information concerning the geographic location of a networked entity, such as a computing device, may be useful for many reasons. For example, geographic location may be utilized to infer demographic characteristics of a network user. Accordingly, geographic information may be utilized to direct advertisements or offer other information via a network that has a higher likelihood of being relevant to a network user at a specific geographic location.

Geographic information may also be utilized by network-based content distribution systems as part of a Digital Rights Management (DRM) program or an authorization process to determine whether particular content may validly be distributed to a certain network location. For example, in terms of a broadcast or distribution agreement, certain content may be blocked from distribution to certain geographic areas or locations. In addition, some sites may refuse access to devices located in areas where the sites' content or service may be illegal.

Content delivered to a specific network entity, at a known geographic location, may also be customized according to the known geographic location. For example, localized news, weather, and events listings may be targeted at a network entity where the geographic location of the networked entity is known. Furthermore content may be presented in a local language and format.

Knowing the location of network entity can also be useful in combating fraud. For example, where a credit card transaction is initiated at a network entity, the location of which is known and far removed from a geographic location associated with an owner of the credit card, a credit card fraud check may be initiated to establish the validity of the credit card transaction.

DETAILED DESCRIPTION

Figure 1:
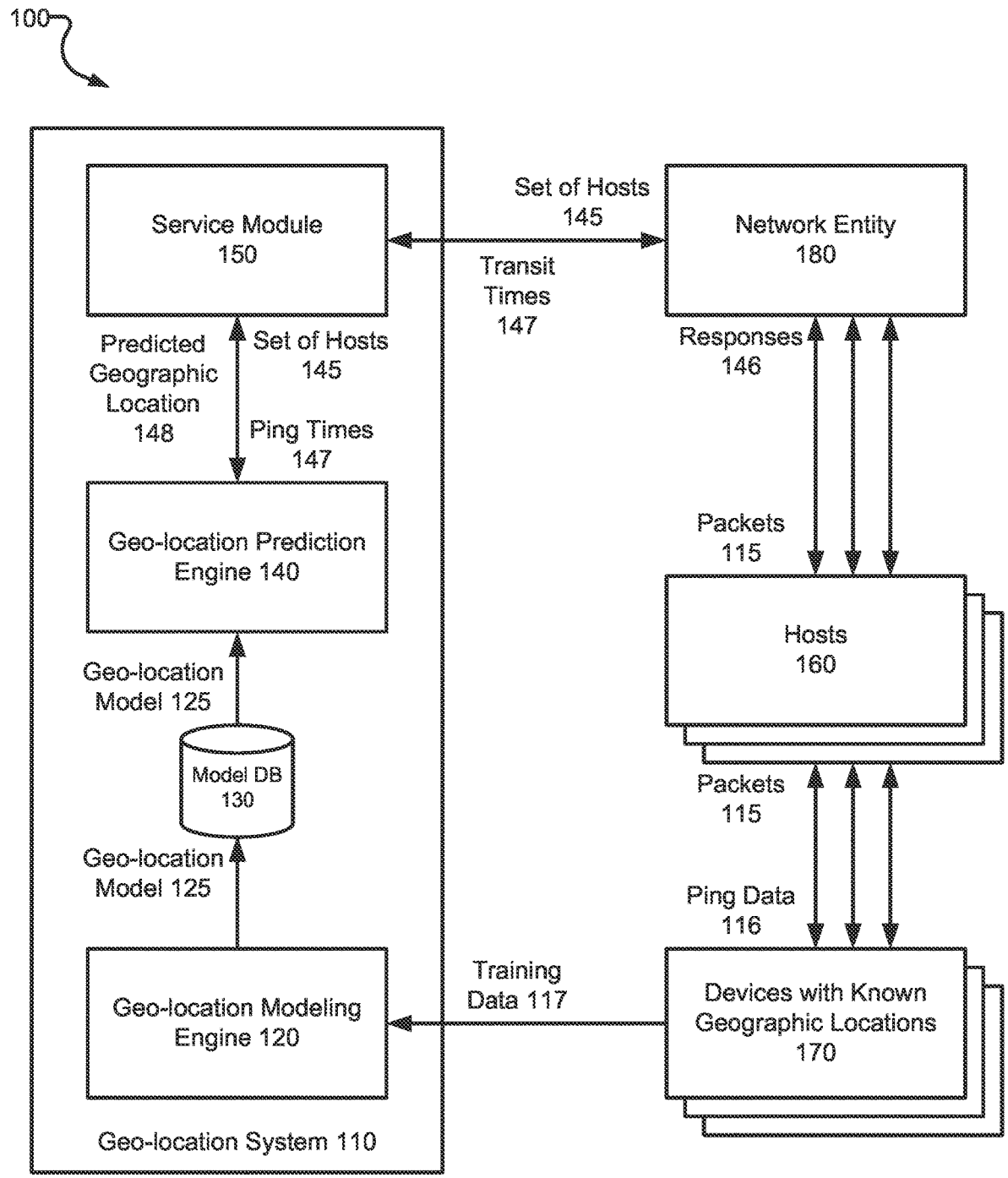
FIG. 1 illustrates an example system for predicting a geographic location of a network entity, in accordance with some aspects.

Examples described herein include a method and system for predicting the geographic location of an IP address belonging to a network entity based on applying a model to a dataset of packet transit times sent from the network entity to a number of hosts on the Internet. More specifically, the method and system can use the model to predict geographic coordinates of the IP address, instead of a jurisdictional location (e.g., a county, city, or country), based on a model which relates packet transit time information to the geographic coordinates. The various aspects do not require that the location is known for the one or more hosts to which packets are sent from the target IP address. The model of some examples is parametric (i.e., the model is based on one or more parameters; e.g., it does not involve finding geographic position of a "nearest" neighbor in the training examples). For example, a parametric model is able to interpolate, extrapolate, and aggregate training examples.

In one aspect, a method for predicting the geographic location of a network entity involves directing the network entity to transmit one or more data packets to a number of predetermined network identifiers, such as IP addresses, where data corresponding to each of the network identifiers is part of a geographic location prediction model. A dataset that represents transit times for the data packets transmitted from the network entity to the hosts identified by the IP addresses is determined, and a geographic location for the network entity is predicted by applying the geographic location prediction model to the dataset.

In some aspects, the geographic location prediction model is a multivariate normal model generated from training data. The training data can be generated from calculating transit times for one or more training data packets transmitted to the hosts from devices located at differing known geographic locations.

According to some examples, each of the transit times for the one or more data packets transmitted from the network entity to the hosts over the network can be calculated by (i) sending a request from a web browser running on the network entity to one of the hosts without opening a socket, (ii) starting a timer on the network entity, and (iii) halting the timer when a response to the request is received.

In some aspects, applying the geographic location prediction model to the dataset also involves applying one or more secondary variables to the received dataset, such as the network entity's line speed, connection type, Internet access provider, time of day, and network congestion.

In further aspects, the geographic location comprises a pair of latitude and longitude coordinates. The hosts can be web servers or any other type of network-enabled device on the Internet, and the network entity can be an end user computing device.

The method and system described herein can be used for fraud detection that involves the prediction of a location of an IP address. Other uses include localized advertising, crime forensics, and helping a business adhere to local, governmental and self-imposed geographic restrictions on usage. For example, preventing a user from a certain country from accessing a given service. Users often employ proxy servers to bypass these types of restrictions, which can make determining the user's location from the outside all but impossible. In addition, attempts to query the user device for location-identifying details can be thwarted by spoofing and other manipulation. In contrast, forging a dataset of packet transmit times to correctly manipulate a user's location would be much more difficult, if not impossible, and the user's machine can be used to pierce proxy servers that would otherwise mask the machine's true location. Furthermore, all of this can be done without the user having to download a separate piece of software or even being aware that their geographic location is being determined and used.

The term "geographic location" shall be taken to refer to any geographic location or area that is identifiable utilizing any descriptor, metric or characteristic. The term "geographic location" shall accordingly be taken to include a continent, a country, a state, a province, a county, a city, a town, village, an address, a Designated Marketing Area (DMA), a Metropolitan Statistical Area (MSA), a Primary Metropolitan Statistical Area (PMSA), location, zip or postal code areas, and congressional districts. Additionally, "geographic location" or "geographic position" can be defined in terms of country/city/state/address, country code/zip code, political region, geographic region designations, latitude/longitude coordinates, spherical coordinates, Cartesian coordinates, polar coordinates, GPS data, cell phone data, directional vectors, proximity waypoints, or any other type of geographic designation system for defining a geographical location or position. Furthermore, the term "location determinant" shall be taken to include any indication or identification of a geographic location.

The term "network identifier" or "network address" shall be taken to include any address that identifies a networked entity and shall include Internet Protocol (IP) addresses. An IP address is a numerical label assigned to each device (e.g., computer, printer, network router) connected to a computer network that uses the Internet Protocol for communication.

Typically, most network addresses (e.g., IP addresses) are associated with a particular geographic location. This is because routers that receive packets for a particular set of machines are fixed in location and have a fixed set of network addresses for which they receive packets. The machines that routers receive packets for tend to be geographically proximal to the routers. Roaming Internet-Ready devices are exceptions. For certain contexts, it is important to know the location of a particular network address or set of addresses. Mapping a particular network address to a geographic location may be termed "geolocation". An exemplary system and methodology by which geographic locations can be derived for a specific network addresses, and for address blocks, are described below. Various methods of obtaining geographic information, combining such geographic information, and inferring a "block" to which a network address corresponds and which shares the same geographic information are described. In some aspects, network blocks can be defined as a set of one or more contiguous IP addresses. Other groupings of network address information can also be considered network blocks and within the scope of the various examples described herein.

One or more aspects described herein provide that methods, techniques and actions performed by a computing device are performed programmatically, or as a computer-implemented method. Programmatically means through the use of code, or computer-executable instructions. A programmatically performed step may or may not be automatic.

System Overview

FIG. 1 illustrates an example system 100 for predicting a geographic location of a network entity, in accordance with some aspects. The system 100 includes a geo-location system 110 comprising a geolocation modeling engine 120, model database 130, geo-location prediction engine 140, and service module 150. System 100 also includes hosts 160, multiple devices with known geographic locations 170, and network entity 180.

Geo-location modeling engine 120, geo-location prediction engine 140, and service module 150 may be implemented using programmatic modules or components. A programmatic module or component may be any combination of hardware and programming capable of performing one or more stated tasks or functions. In addition, a module or component can exist on a hardware component independently of other modules or components. Alternatively, a module or component can be a shared element or process of other modules, programs or machines.

Furthermore, one or more examples described herein may be implemented through the use of instructions that are executable by one or more processors. These instructions may be carried on a non-transitory computer-readable medium. Machines shown or described with figures below provide examples of processing resources and non-transitory computer-readable media on which instructions for implementing some aspects can be carried and/or executed. In particular, the numerous machines shown in some examples include processor(s) and various forms of memory for holding data and instructions. Examples of non-transitory computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on non-transitory computer-readable media.

Alternatively, a computing device or one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

In one aspect, predicting the geographic location of a network entity 180 involves two phases. First, geo-location system 110 gathers training data 117 to create a geo-location model 125 that can be used to predict a geographic location. Second, geo-location system 110 directs the network entity 180 to transmit one or more data packets 115 to a number of hosts 160, and the resulting data set is applied to the geo-location model 125 to predict a geographic location for the network entity 180.

Figure 3:
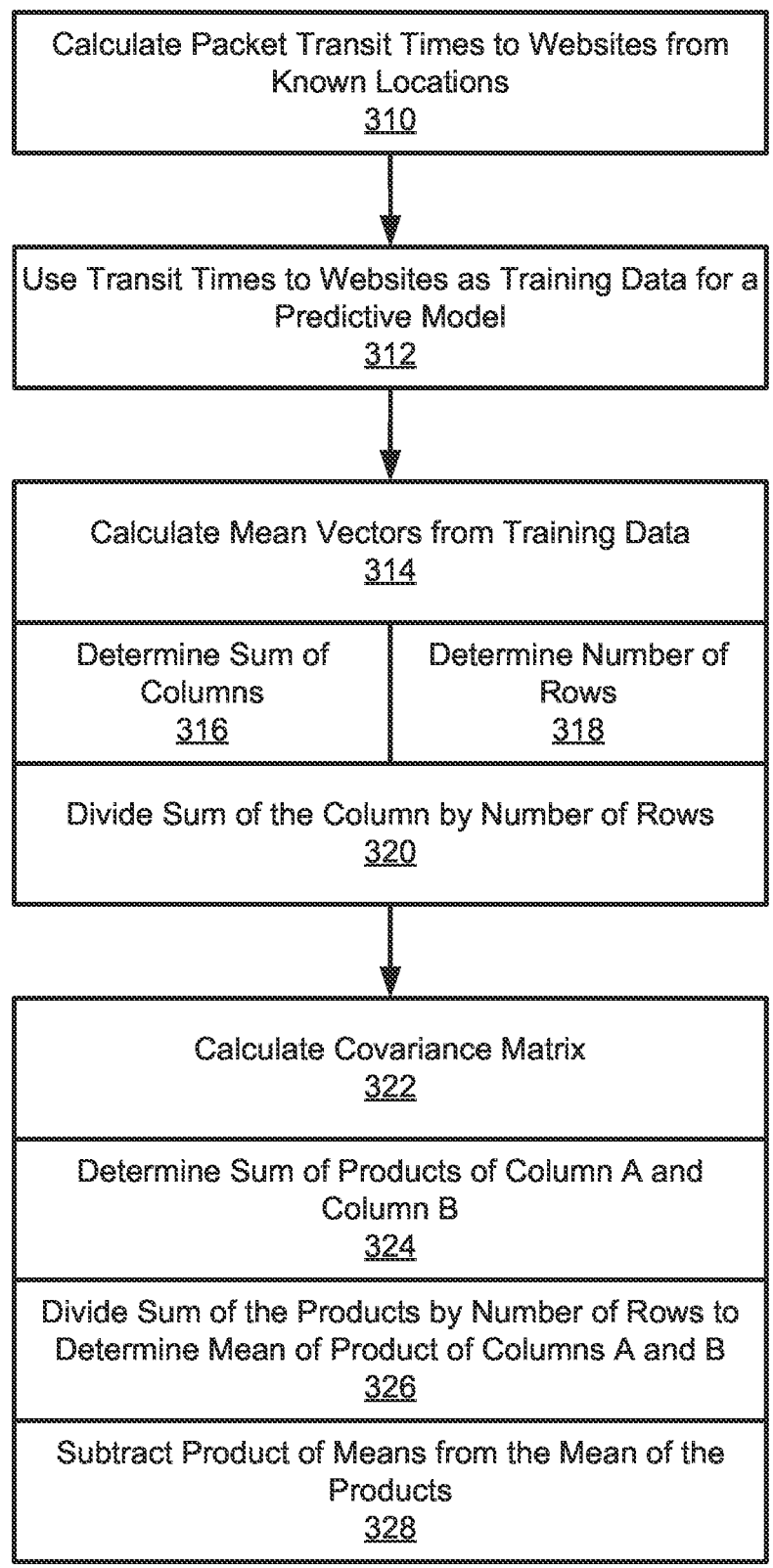
FIG. 3 illustrates an example method for creating a geographic location prediction model, in accordance with some aspects.

In some examples, geo-location modeling engine 120, shown in more detail in FIG. 3, can construct the geo-location model 125 from training data 117. A number of devices with known geographic locations 170 send packets 115 to hosts 160 and calculate ping data 116 based on the time elapsed since each of the packets 115 were sent. In one example, this process can utilize sending Internet Control Message Protocol (ICMP) echo request packets from a device to hosts 160, waiting for an ICMP response, and then measuring the time from transmission to reception (round-trip time), also known as a ping. A set of this ping data 116 from one device to some or all of the known hosts 160 combined with the device's geographic location is a piece of training data 117. The more devices 170 for which training data 117 is available can increase the resulting accuracy of the geolocation model 125. Furthermore, new training data 117 can be sent to the geo-location system 110 at any time to update the geo-location model 125 in order to increase accuracy of the model.

In some aspects, devices with known geographic locations 170 can be any network-enabled devices such as personal computers or mobile devices as long as the geographic location of the device is known at the time the packets 115 are sent and ping data 116 is created. Hosts 160 can also be any network-enabled devices identified by an IP address, hostname, or other network identifier, such as web servers or routers. While the geographic locations of hosts 160 can be unknown, they should be geographically fixed so that ping data 116 is relatively consistent.

Once created, geo-location model 125 can be stored in a model database 130 for later retrieval by geo-location prediction engine 140. Depicted here as part of geo-location system 110, model database 130 can also be a separate database server on a network. Service module 150 is a component that handles geographic location requests, such as from a web server or other network server. Service module 150 can be provided within geo-location system 110 as part of a web server or alternatively, in some examples, as a separate server is communication with other servers that make geographic location requests to the service module 150.

When a server or other device requests a geographic location for network entity 180, service module 150 can send network entity 180 a set of hosts 145. This set can contain a specific or randomized selection of identifiers for hosts 160. Once received, network entity 180 sends a number of packets 115 to the hosts 160 identified in the set of hosts 145 received from the service module 150. Then, based on the time of responses 146 from the hosts 160, the network entity 180 transmits transit times 147 back to the service module for use in predicting the entity's geographic location. In some aspects, the geographic location process is performed within a web browser on network entity 180 unbeknownst to the user. In addition, a script or other browser component sending the packets 115 may take certain secondary variables into consideration when determining transit times 147. For example, the network entity's line speed, type of connection, internet access provider, time of day when packets 115 are sent, and current network congestion can all be taken into consideration. In other aspects, network entity 180 returns only the transit times 147 without secondary variables and service module 150, and service module 150 can apply some secondary variables then, such as the time of day and internet access provider, among others.

Service module 150 can send the transit times 147 received from network entity 180 to the geo-location prediction engine 140, which applies the geo-location model 125 to the transit times 147 in order to calculate a predicted geographic location 148 for network entity 180. Service module 150 can then use this information for various purposes, such as determining which content to display to network entity 180 or to allow access based on location.

Figure 2:
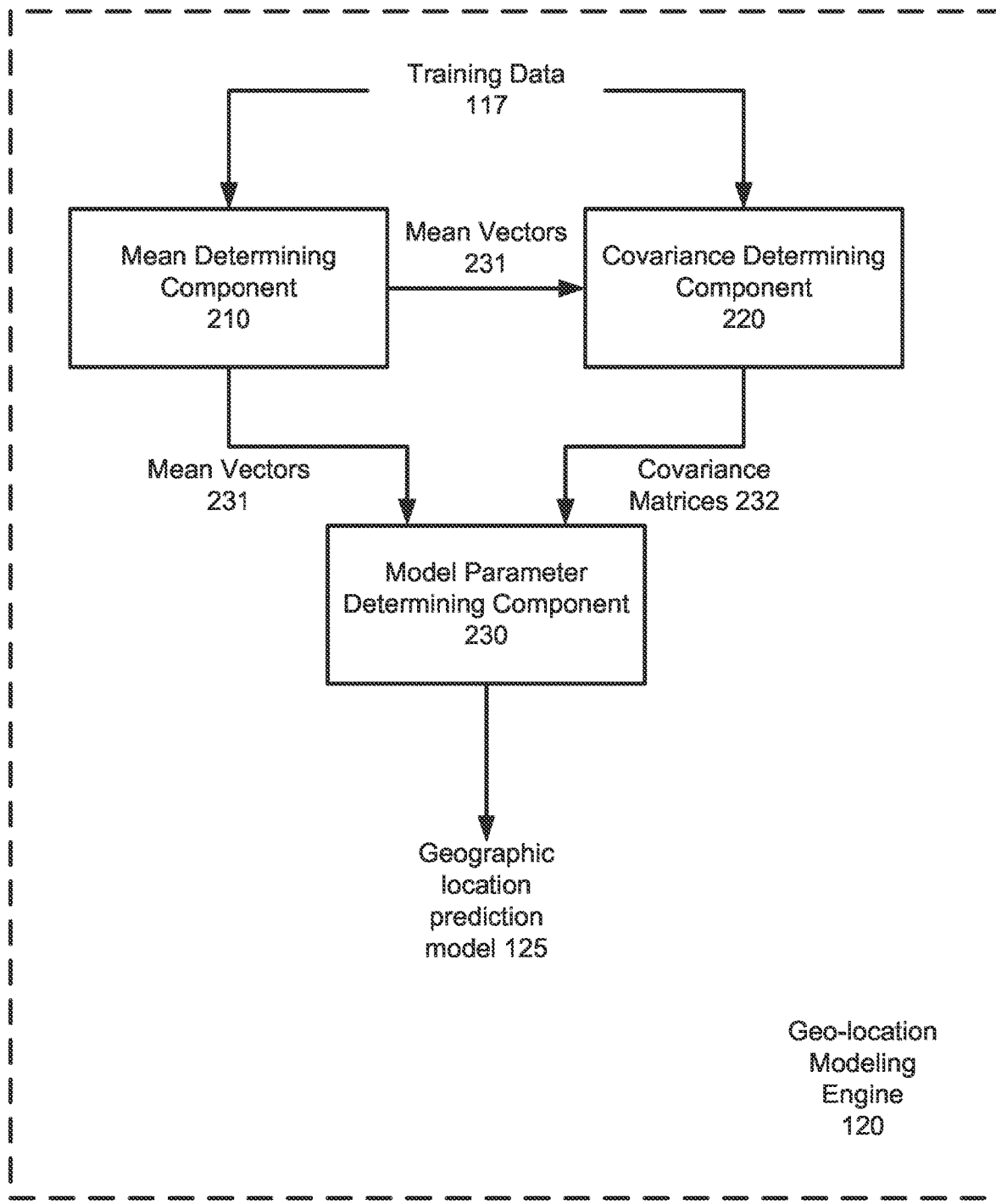
FIG. 2 illustrates an example component for using training data to determine parameters of a geographic location prediction model, in accordance with some aspects.

FIG. 2 illustrates an example geo-location modeling engine 120 for using training data 117 to determine parameters of a geographic location prediction model 125, in accordance with some aspects. FIG. 2 shows the training data 117 provided as input to both the mean determining component 210 and the covariance determining component 220. As explained with respect to FIG. 1, the training data 117 can comprise the latitude and longitude of an IP address and corresponding information including ping data 116 associated with the IP address.

The mean determining component 210 can produce mean vectors 231 that represent the typical round-trip transit times for packets 115 between each device with known geographic location 170 for some or all hosts 160 and the geographic coordinates. The covariance determining component 220 can produce covariance matrices 232 that represent the deviation associated with the typical round-trip transit times for packets 115 between each device with known geographic location 170 for some or all hosts 160 and the geographic coordinates. The mean vectors 231 and covariance matrices 232 that characterize the training data 117 can together be used by the parameter determining component 230 to produce the parameters that comprise the geographic location prediction model 125. This parametric model can be used to predict the geographic coordinates of network entities when provided an IP address or other network identifier for the entity.

Methodology

FIG. 3 illustrates a method for creating a geographic location prediction model, according to some aspects. While operations of the method 300 are described below as being performed by specific components, modules or systems of the computer system 100, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

With reference to an example of FIG. 3, devices with known geographic locations 170, as described with FIG. 1, calculate packet transmit times to websites or other network devices, such as hosts 160 (310). In some examples, the identity of hosts 160 is chosen by operators of geolocation system 110 and the training data 117 is collected by the operators or on their behalf. Devices 170 can send packets 115 to all hosts 160 or only some of them, such as ones that are known or predicted to be geographically near each device. Based on transit times of packets 115, devices 170 calculate ping data 116. This data along with the known geographic locations of the devices 170 is combined to comprise training data 117, which is used as training data for a geo-location predictive model (312).

The geo-location modeling engine 120 can then calculate mean vectors from the training data 117 using, for example, a mean determining component 210 as described with FIG. 2 (314). These calculations can be run in parallel for every column or pairs of columns in the training data 117. In some aspects, a mean vector represents the mean of all the columns. The mean of a column is the sum of the column over the training data 117 divided by the number of rows in the training data 117. First, the mean determining component 210 computes the sum of a column of training data (316) and determines the number of rows in the training data (318). With the sum of a column and the number of rows, mean determining component 210 divides the sum of the column of training data by the number or rows of training data (320). The result produced represents the mean of a column of training data. Such a result can be similarly computed for each column of the training data to produce a mean vector 231 corresponding to the training data. This mean vector 231 can be used as input for the model parameter determining component 330, which can produce the parameters for the geographic location prediction model 125 based on the mean vector 331 computed from the training data 117. In addition, mean vectors 231 can also be used as input to covariance determining component 220 to calculate covariance matrices 232 (322).

Similarly to calculating mean vectors 231, these calculations can also be run in parallel for every column or pairs of columns in the training data 117. In some aspects, a covariance matrix represents the covariance of all pairs of columns in the training data. The covariance of a pair of columns is the mean of the product of the pairs of columns minus the product of the means of the columns. As shown in FIG. 2, covariance determining component 220 receives the training data 117 as an input. The covariance determining component 220 computes a sum of the products of values from column A and column B of the training data (324). In this manner, a pair of columns from the training data is multiplied together and a sum of the products from the pair of columns is computed. Covariance determining component 220 can then divide the sum of the products from the pair of columns by the number of rows to determine the mean of the products of column A and column B (326). The mean of the products of column A and column B is then used with the mean of column A and the mean of column B as computed by the mean determining component 210 described above to generate the covariances. The covariance determining component 220 subtracts the product of the means from the means of the products (328). As a result, a covariance of column A and column B is generated. Such a result can be similarly computed for each pair of columns of the training data to produce a covariance matrix 332 corresponding to the training data. This covariance matrix 332 can be used as input for the parameter determining component 330, which can produce the model's parameters based on the mean vector 331 and the covariance matrix 332 computed from the training data 117. These parameters can be used in geographic location prediction model 125 to predict the geographic coordinates of a target IP address, such as network entity 180.

Figure 4:
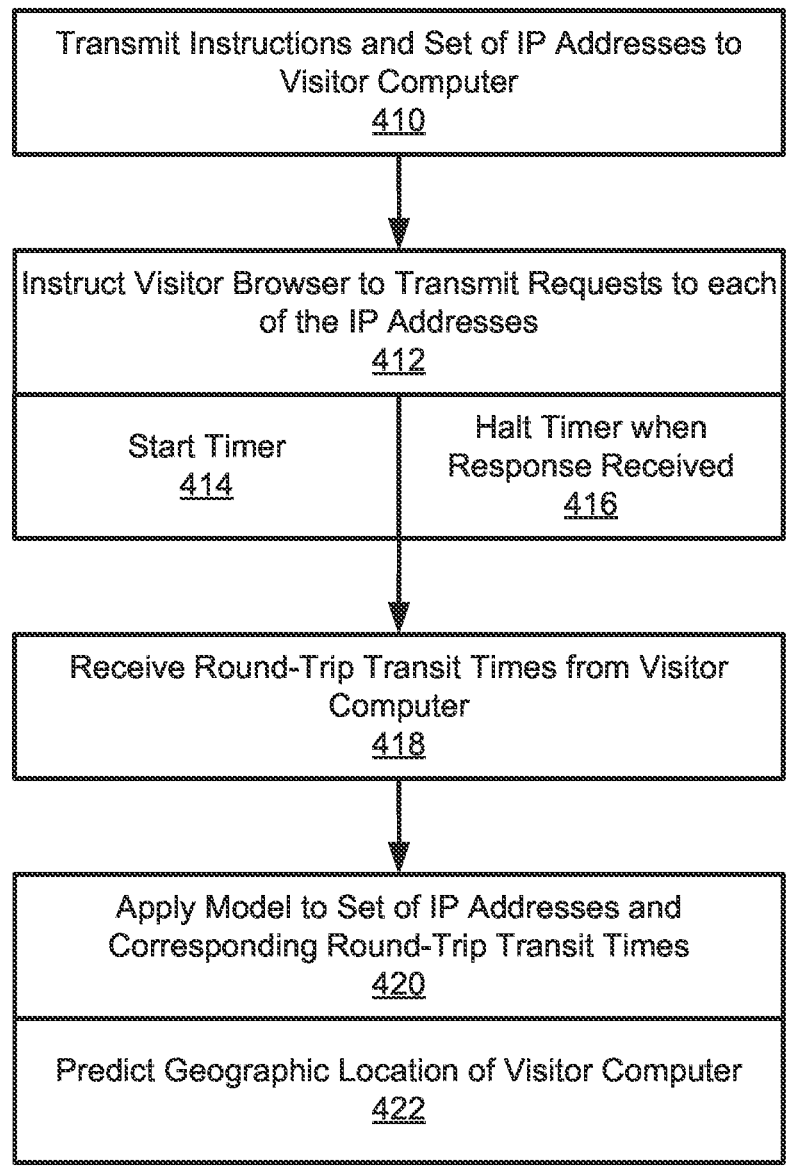
FIG. 4 illustrates an example method for predicting a geographic location of a network entity, in accordance with some aspects.

FIG. 4 illustrates an example method for predicting a geographic location of a network entity 180, in accordance with some aspects. In some aspects, geo-location system 110 attempts to predict the geographic location of network entity 180 when network entity 180 attempts to access a computer system or content on a computer system associated with geolocation system 110. For example, when a user on a computer visits a website running geo-location system 110, a server can determine how to route the user's computer, which content to display to the user, or whether to allow access to the website based on the predicted geographic location 148 of the user's computer.

In some aspects, in order to predict the geographic location of the network entity 180, service module 150 first selects a set of hosts 145. This set can be stored in a database or memory location associated with geo-location prediction engine 140. In addition, the set of hosts 145 may be selected in various ways. For example, if the number of hosts 160 associated with the system 100 is small, the set may comprise all of them. Alternatively, a predetermined number of hosts 160 can be chosen at random, thereby reducing the load on the service module 150 and network entity 180 in cases where the number of hosts 160 is large. Selecting hosts 160 at random can also serve another use: making it more difficult for a user of network entity 180 to spoof, or fake, transit times 147 to manipulate his predicted geographic location 148.

Once the set of hosts 145 has been chosen, service module 150 sends the set of hosts 145 to the network entity 180 along with instructions to send packets 115 to the hosts identified in the set (412). In some aspects, these instructions can be commands executed in a browser applet, such as with JavaScript. In addition, the JavaScript applet can be required to access the website, service, or content associated with service module 150 so that a user of network entity 180 must allow the applet to run. Furthermore, the JavaScript applet can be configured to bypass browser proxy settings so that the user is unable to use a proxy server to authenticate with service module 150, thereby masking his true IP address.

In some aspects, network entity starts a timer when it sends one or more packets 115 to one of the hosts 160 identified in the set of hosts 145 (414). When a response 146 is received by the network entity 180, the timer is halted and a round-trip transit time, or ping time, is calculated based on the time elapsed (416). In one example, network entity 180 sends packets 115 to all hosts 160 in the set of hosts 145 simultaneously and calculates transit times for each. Alternatively, network entity 180 can send packets 115 to a limited number of hosts 160 at the same time in order to not impact performance of computing resources or bandwidth. In some aspects, the packet sending, receiving, and timer functions are part of the JavaScript applet for security and do not use an ICMP ping command.

Once responses 146 have been received and transit times calculated as transit times 147, network entity 180 sends transit times 147 back to service module 150 (418). Service module 150 sends the ping times 147 to geo-location prediction engine 140, which applies the geo-location model 125 to the ping times 147 and associated set of hosts 145 (420). Based on the output of the geo-location model 125, geo-location prediction engine 140 can compute a predicted geographic location 148 for network entity 180 (422). Service module 150 can then use that geographic information to route the network entity 180, determine which content to display, or determine whether to allow access to a computer system, among other possibilities.

Figure 5:
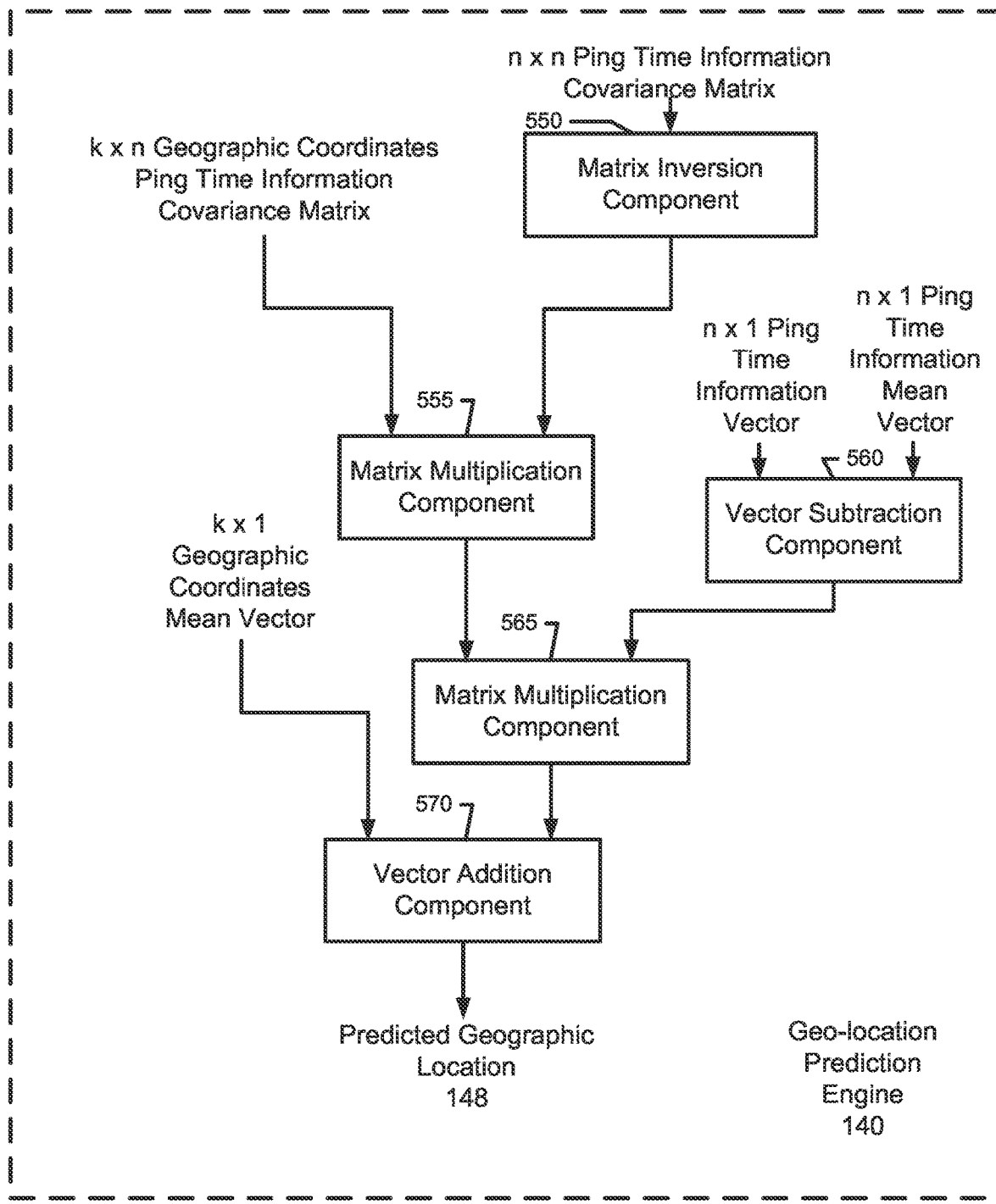
FIG. 5 illustrates an example component for applying a geographic location prediction model to a dataset to predict the geographic location of a network entity, in accordance with some aspects.

FIG. 5 illustrates an example geo-location prediction engine 140 for applying a geographic location prediction model to a dataset to predict the geographic location of a network entity, in accordance with some aspects. In particular, the example subcomponents shown in FIG. 5 illustrate the use of a conditional multivariate normal distribution model to predict geographic coordinates, given various forms of the input data packet transmit time, or ping time, information. In this example, the various forms of the input ping time information include: 1) an n×n ping time information covariance matrix, which represents how the ping time information co-varies with itself (n is the number of components which comprise the ping time information); 2) a k×n geographic coordinates ping time information covariance matrix, which represents how the target geographic coordinates position co-varies with the ping time information (k is the number of components which comprise the geographic coordinates); 3) a k×1 geographic coordinates mean vector, which represents the average (or typical) values of the output geographic coordinates; 4) an n×1 ping time information mean vector, which represents type the average (or typical) values of the ping time information; and 5) an n×1 ping time information vector, which represents the actual ping time information for an IP address for which the geographic coordinates are to be predicted. As denoted herein and in FIG. 5, n is the number of components which comprise the ping time information and k is the number of components which comprise the geographic coordinates. Each of these ping time information inputs, as shown in FIG. 5, is used by the geo-location prediction engine 140 to produce a predicted geographic coordinate position corresponding to a desired target network entity or network block.

As shown in FIG. 5, a multivariate normal model comprises a mean vector and a covariance matrix, in accordance with some examples. The mean vector might represent the typical round-trip transit times for a number of hosts and the typical geographic coordinates, and the covariance matrix might represent the deviation associated with pairs of those typical values. Both sets of parameters can be used to predict the geographic coordinates of a target IP address. Other models might have different parameters and different methods by which to combine those parameters. The source data for the model might be derived from training data or supplied by a human. For example, the mean might represent the average from training data. Similarly, the covariance matrix might represent the sample covariance from training data. The model data can also be obtained from automated means but also be hand-tuned. One aspect of the model of the various examples described herein is that the form of the model is parametric.

One aspect involves using, as the model, a conditional multivariate normal distribution with mean vector m and covariance matrix s. The input to the model is the ping time information from one or more hosts and the output is a prediction comprising most likely geographic coordinates and the covariance of that prediction. Other aspects involve prediction with conditional multivariate normal distributions grouped into one or more subclasses, which enable higher accuracy. It may be possible to use other methods such as neural nets; but, such methods may not achieve the same speed, accuracy, and output as the aspects described herein. For example, neural nets will not produce a covariance matrix of the resulting geographic coordinates. In one aspect, the predicted geographic coordinate position of the network entity is based upon an interpolation of at least two ping times.

The processing operations shown in FIG. 5 can be viewed as a way to adjust the typical geographic coordinate position of an IP address (not necessarily the target one) with information from the data packet transmit times. In particular, the matrix inversion operation performed by Matrix Inversion Component 550, the vector subtraction operation performed by the Vector Subtraction Component 560, and the matrix multiplication operations performed by Matrix Multiplication Components 555 and 565 determine how to weight the difference between the typical ping time values and the actual ping time values for an IP address for which the geographic coordinates are to be predicted. The vector addition operation performed by the Vector Addition Component 570 combines the weighted ping time variances for a particular IP address with the average (or typical) values of the output geographic coordinates. The output produced by the geo-location prediction engine 140, as shown in FIG. 1, is a k×1 predicted geographic location 148 vector that represents most likely geographic coordinates for this conditional multivariate normal distribution corresponding to the actual ping time values for the IP address for which the geographic coordinates are to be predicted. The output predicted geographic location 148 can be provided to the service module 150, as shown in FIG. 1, which can generate geographic coordinates data in a form suitable for a particular requesting application or database repository. As described above, the generated geographic coordinates data can include geographic coordinates in terms of geographic region designations, latitude/longitude coordinates, spherical coordinates, Cartesian coordinates, polar coordinates, GPS data, cell phone data, directional vectors, proximity waypoints, or any other type of geographic designation system for defining a geographical location.

Computer System

Figure 6:
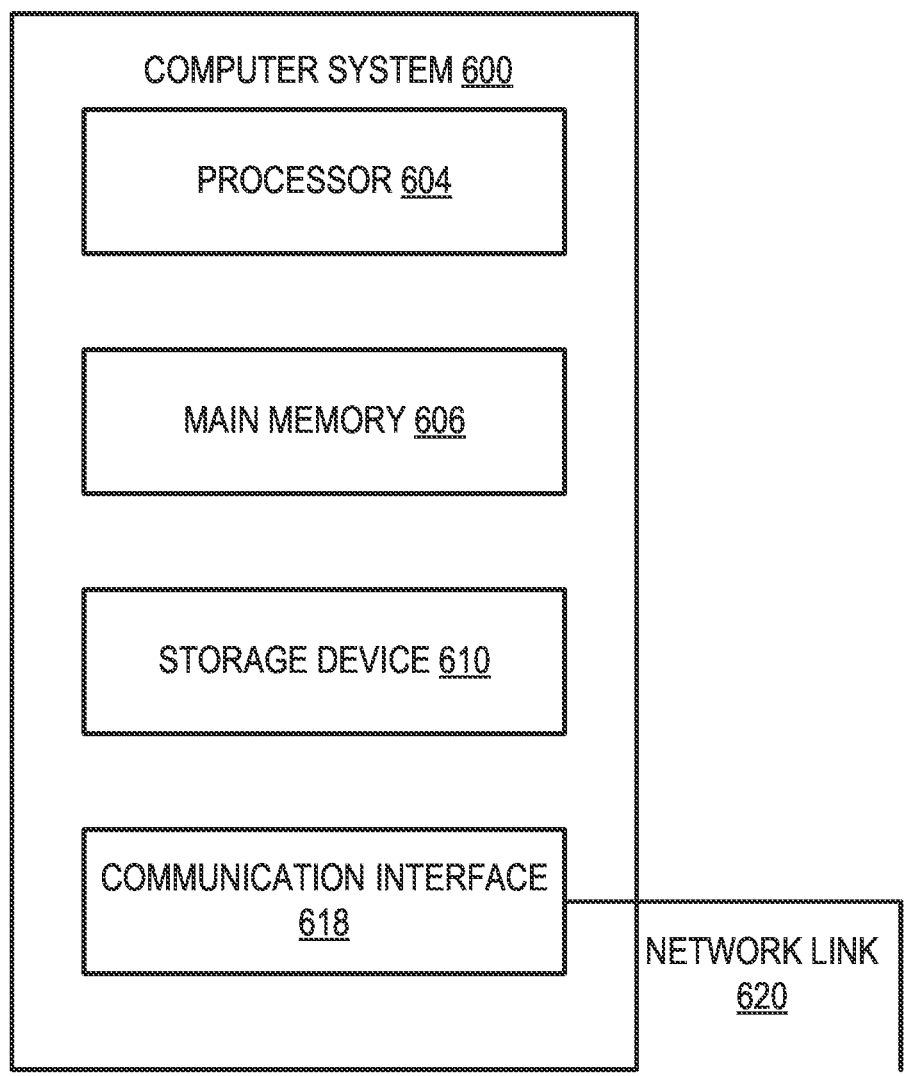
FIG. 6 is a block diagram that illustrates a computer system upon which aspects described herein may be implemented.

FIG. 6 is a block diagram that illustrates a computer system upon which aspects described herein may be implemented. For example, in the context of FIG. 1, system 100 may be implemented using one or more servers such as described by FIG. 6.

In an aspect, computer system 600 includes processor 604, memory 606 (including non-transitory memory), storage device 610, and communication interface 618. Computer system 600 includes at least one processor 604 for processing information. Computer system 600 also includes the main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. The storage device 610, such as a magnetic disk or optical disk, is provided for storing information and instructions. The communication interface 618 may enable the computer system 600 to communicate with one or more networks through use of the network link 620 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 600 for implementing the techniques described herein. According to one aspect, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an example, can be combined with other individually described features, or parts of other aspects. Thus, absence of describing combinations should not preclude the inventor(s) from claiming rights to such combinations.

What is claimed is:

1. A method for predicting a geographic location of a network entity, the method comprising:
   receiving, by a server on a network, a request for a geographic location of the network entity on the network;
   in response to receiving the request, selecting, by the server, a set of hosts at random, wherein each host in the set of hosts is associated with a geographic location prediction model, wherein the geographic location prediction model is created based at least in part on training data comprising ping data for one or more training data packets transmitted to at least one host of the set of hosts from one or more devices located at respective known geographic locations;
   sending, by the server to the network entity, instructions for the network entity to transmit one or more data packets to each host of the selected set of hosts;
   receiving, by the server, a plurality of transit times for the one or more data packets transmitted from the network entity to each host of the selected set of hosts;
   determining, by the server, a dataset based at least in part on the received plurality of transit times; and
   predicting, by the server, the geographic location of the network entity by applying the geographic location prediction model to the dataset.

2. The method of claim 1, wherein the geographic location prediction model is a multivariate normal model generated from the training data.

3. The method of claim 2, wherein the training data further comprises the known geographic locations of the one or more devices, and wherein the ping data is generated from calculating transit times for the one or more training data packets.

4. The method of claim 1, wherein applying the geographic location prediction model to the dataset comprises applying one or more secondary variables to the dataset, wherein the one or more secondary variables comprise a line speed of the network entity, a connection type, an Internet access provider, a time of day, and network congestion.

5. The method of claim 1, wherein the geographic location comprises latitude and longitude coordinates.

6. The method of claim 1, wherein each host of the set of hosts is a web server on the Internet.

7. The method of claim 1, wherein the instructions for the network entity to transmit one or more data packets to each host of the selected set of hosts comprise instructions to transmit the one or more data packets to respective Internet protocol (IP) addresses of the hosts.

8. The method of claim 1, wherein the instructions for the network entity to transmit one or more data packets to each host of the selected set of hosts comprise commands to be executed in a browser applet associated with a web browser on the network entity.

9. The method of claim 8, wherein the instructions for the network entity to transmit one or more data packets to each host of the selected set of hosts further comprise directing the browser applet associated with the web browser on the network entity to transmit the one or more data packets to each host of the set of hosts.

10. The method of claim 9, further comprising directing the network entity to configure the browser applet to bypass proxy settings of the web browser.

11. The method of claim 1, further comprising controlling access of the network entity to server resources based at least in part on the geographic location determined for the network entity.

12. A geolocation system comprising:
   a memory resource to store instructions;
   one or more processors using the instructions stored in the memory resource to:
      receive a request for a geographic location of a network entity;
      in response to receiving the request, select a set of hosts at random, wherein each host in the set of hosts is associated with a geographic location prediction model, wherein the geographic location prediction model is created based at least in part on training data comprising ping data for one or more training data packets transmitted to at least one host of the set of hosts from one or more devices located at respective known geographic locations;
      send, to the network entity, instructions for the network entity to transmit one or more data packets to each host of the selected set of hosts;
      receive a plurality of transit times for the one or more data packets transmitted from the network entity to each host of the set of hosts;
      determine a dataset based at least in part on the received plurality of transit times; and
      predict the geographic location for the network entity by applying the geographic location prediction model to the dataset.

13. The geolocation system of claim 12, wherein the geographic location prediction model is a multivariate normal model generated from the training data.

14. The geolocation system of claim 12, wherein the training data further comprises the known geographic locations of the one or more devices, and wherein the ping data is generated from calculating transit times for the one or more training data packets.

15. The geolocation system of claim 12, wherein applying the geographic location prediction model to the dataset also comprises applying one or more secondary variables to the dataset, wherein the one or more secondary variables comprise a line speed of the network entity, a connection type, an Internet access provider, a time of day, and network congestion.

16. The geolocation system of claim 12, wherein the geographic location comprises latitude and longitude coordinates.

17. The geolocation system of claim 12, the one or more processors further using the instructions stored in the memory resource to direct a browser applet associated with a web browser on the network entity to transmit the one or more data packets to each host of the set of hosts.

18. The geolocation system of claim 17, the one or more processors further using the instructions stored in the memory resource to direct the network entity to configure the browser applet to bypass proxy settings of the web browser.

19. The geolocation system of claim 12, the one or more processors further using the instructions stored in the memory resource to control access of the network entity to server resources based at least in part on the geographic location determined for the network entity.

20. A non-transitory computer-readable medium for geolocation of a network device, the non-transitory computer-readable medium storing instructions that, when executed by one or more processors, cause the one or more processors to perform operations that include:
- receiving a request for a geographic location of a network entity;
- in response to receiving the request, selecting a set of hosts at random, wherein each host in the set of hosts is associated with a geographic location prediction model, wherein the geographic location prediction model is created based at least in part on training data comprising ping data for one or more training data packets transmitted to at least one host of the set of hosts from one or more devices located at respective known geographic locations;
- sending, to the network entity, instructions for the network entity to transmit one or more data packets to each host of the selected set of hosts;
- receiving a plurality of transit times for the one or more data packets transmitted from the network entity to each host of the set of hosts;
- determining a dataset based at least in part on the received plurality of transit times; and
- predicting the geographic location for the network entity by applying the geographic location prediction model to the dataset.

* * * * *